United States Patent
Park et al.

(10) Patent No.: US 9,951,675 B2
(45) Date of Patent: Apr. 24, 2018

(54) STRUCTURE OF INTERCOOLER COVER INTEGRATED INTO FAN SHROUD FOR TURBOCHARGED ENGINE AND METHOD FOR OPERATING THE SAME

(71) Applicant: HYUNDAI MOTOR COMPANY, Seoul (KR)

(72) Inventors: Dang-Hee Park, Seoul (KR); Yong-Beom Park, Gunpo-si (KR); Bong-Soo Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 263 days.

(21) Appl. No.: 14/926,906

(22) Filed: Oct. 29, 2015

(65) Prior Publication Data
US 2016/0298524 A1 Oct. 13, 2016

(30) Foreign Application Priority Data
Apr. 7, 2015 (KR) ........................ 10-2015-0048988

(51) Int. Cl.
| | |
|---|---|
| *F01P 7/02* | (2006.01) |
| *B60K 11/04* | (2006.01) |
| *F01P 3/18* | (2006.01) |
| *F01P 1/06* | (2006.01) |
| *F01P 5/02* | (2006.01) |
| *B60K 11/08* | (2006.01) |

(52) U.S. Cl.
CPC .............. *F01P 7/02* (2013.01); *B60K 11/04* (2013.01); *B60K 11/085* (2013.01); *F01P 1/06* (2013.01); *F01P 3/18* (2013.01); *F01P 5/02* (2013.01); *F01P 2003/185* (2013.01); *F01P 2060/02* (2013.01); *Y02T 10/88* (2013.01)

(58) Field of Classification Search
CPC ........ F01P 7/02; F01P 1/06; F01P 3/18; F01P 5/02; B60K 11/04; B60K 11/085
See application file for complete search history.

(56) References Cited

U.S. PATENT DOCUMENTS

| | | | |
|---|---|---|---|
| 2004/0104007 A1 | 6/2004 | Kolb | |
| 2004/0163864 A1 | 8/2004 | Sasano et al. | |
| 2008/0017138 A1* | 1/2008 | Rogg | .................... B60K 11/04 123/41.05 |

FOREIGN PATENT DOCUMENTS

| | | |
|---|---|---|
| JP | 2011-025812 A | 2/2011 |
| JP | 2011-126328 A | 6/2011 |
| JP | 2011-127449 A | 6/2011 |
| KR | 20-1998-0049936 U | 10/1998 |
| KR | 10-2008-0010526 A | 1/2008 |
| KR | 10-0792905 B1 | 1/2008 |

(Continued)

OTHER PUBLICATIONS

Search Report dated Jul. 11, 2016, issued in European Patent Application No. 15192516.1.

*Primary Examiner* — Kevin A Lathers
(74) *Attorney, Agent, or Firm* — McDermott Will & Emery LLP

(57) ABSTRACT

A structure of an intercooler cover integrated into a fan shroud includes an intercooler rear-side portion mounted to a rear side of the intercooler. A cooling module rear-side portion is mounted to a rear side of a cooling module. A ventilator communicates with one side of the intercooler rear-side portion and one side of the cooling module rear-side portion.

17 Claims, 11 Drawing Sheets

(56) References Cited

FOREIGN PATENT DOCUMENTS

| KR | 10-2008-0043971 A | 5/2008 |
| KR | 10-2010-0030332 A | 3/2010 |
| KR | 10-2011-0061216 A | 6/2011 |
| KR | 10-2012-0063116 A | 6/2012 |
| KR | 10-2013-0028424 A | 3/2013 |
| WO | 2005/119024 A1 | 12/2005 |
| WO | 2008/111906 A1 | 9/2008 |

\* cited by examiner

STRUCTURE OF INTERCOOLER COVER INTEGRATED INTO FAN SHROUD FOR TURBOCHARGED ENGINE AND METHOD FOR OPERATING THE SAME

CROSS-REFERENCE TO RELATED APPLICATION

This application claims the benefit of priority to Korean Patent Application No. 10-2015-0048988 filed in the Korean Intellectual Property Office on Apr. 7, 2015, which is incorporated herein by reference in its entirety.

TECHNICAL FIELD

The present disclosure relates to a structure of an intercooler cover integrated into a fan shroud for a vehicle engine, and a method for operating the same, capable of improving efficiency of a conventional air-cooled intercooler.

BACKGROUND

Recently, a vehicle having a turbo engine has been rapidly increased for downsizing an engine and improving fuel consumption. Performance (such as engine output and fuel consumption) of the turbo engine is influenced by a cooling efficiency of an intercooler. Therefore, the cooling efficiency of the intercooler is a significant factor of vehicle performance. When the cooling efficiency of the intercooler is improved, the engine output and the fuel consumption may improve as a charging efficiency increases.

FIGS. 1-3 illustrate a structure of an intercooler according to a conventional art. As shown in FIGS. 1-3, a cooling module for an engine cooling system and an intercooler for cooling charge air in a turbocharger engine are mounted to a front side of a vehicle such that cooling is performed by headwind flowing into an engine compartment during vehicle driving. In addition, a cooling fan for easily inhaling air and sending air to an engine is mounted at a rear side of the cooling module.

The intercooler may include a water-cooled charge air intercooler which cools the charge air by applying extra coolant and an air-cooled intercooler which cools the charge air by the headwind flowing thereinto through a radiator grille and an opening hole formed at a lower portion of a bumper cover. Among these, the water-cooled intercooler increases weight and cost because an additional device and the extra coolant are required.

Further, as shown in FIG. 4, cooling efficiency of the intercooler significantly decreases because the cooling of the charge air using headwind is difficult when a vehicle idles, whereby engine output and fuel consumption are deteriorated.

SUMMARY

The present disclosure has been made in an effort to provide a structure of an intercooler cover integrated into a fan shroud and a method for operating the same having advantages of guiding air flow in accordance with a pressure difference generated by fan wind of a cooling module.

A structure of an intercooler cover integrated into a fan shroud according to an exemplary embodiment of the present inventive concept may include an intercooler rear-side portion which covers a rear side of an intercooler. A cooling module rear-side portion covers a rear side of a cooling module. A ventilator communicates with one side of the intercooler rear-side portion and one side of the cooling module rear-side portion.

The structure may further include at least one flap door installed at another side of the intercooler rear-side portion which is vertical with respect to a vehicle driving direction to block heat to be transferred from an engine compartment to the intercooler when a vehicle stops and idles.

The structure of an intercooler cover integrated into a fan shroud may further include a hinge rotatably coupling the flap door with the intercooler rear-side portion.

The hinge may be a spring.

The flap door may be opened when the vehicle travels.

The flap door may be closed when the vehicle stops and idles.

The flap door may be formed of an insulator.

The ventilator may include a partition wall which prevents air from flowing backward from the cooling module rear-side portion to the intercooler rear-side portion.

The partition wall may be connected to the one side of the cooling module rear-side portion.

The partition wall may include a first partition wall which is connected to a front end toward a rear end of the ventilator with respect to the vehicle driving direction.

The partition wall may include a second partition wall which is slantingly installed at a rear end of the ventilator with respect to the vehicle driving direction into the ventilator.

A central cross-sectional area of the ventilator may be wider than cross-sectional areas of both ends thereof.

The ventilator may be have a diffuser shape having an increasing cross-sectional area, a pipe shape having a constant cross-sectional area, and a nozzle shape having a decreasing cross-sectional area. The cross-sectional areas of the ventilator are sequentially coupled along a direction from the intercooler rear-side portion toward the cooling module rear-side portion.

The intercooler rear-side portion may include a stopper formed at an opening of the flap door to open the flap door in one direction opposite to the vehicle driving direction.

An operation method for a structure of an intercooler cover integrated into a fan shroud according to another exemplary embodiment of the present inventive concept may include opening a flap door by using headwind when a vehicle travels, and closing the flap door when the vehicle stops and idles.

As described above, according to the present disclosure, the cooling efficiency of the intercooler increases by guiding the air flow in accordance with a pressure difference generated by fan wind when a vehicle idles such that vehicle performance such as vehicle output and fuel consumption can be improved.

Furthermore, the amount of air passing through the intercooler increases by guiding the air flow in accordance with the pressure difference generated by a fan wind even during vehicle driving such that the cooling efficiency of the intercooler increase, whereby vehicle performance such as vehicle output and fuel consumption can be improved.

DETAILED DESCRIPTION OF THE EMBODIMENTS

Terms and words used in the present specification and claims are not to be construed as a general or dictionary meaning, but are to be construed as meaning and concepts meeting the technical ideas of the present disclosure based on a principle that the present inventors may appropriately define the present invention as the concepts of terms in order to describe their disclosures in best mode. Therefore, the configurations described in the exemplary embodiments and drawings of the present inventive concept are merely examples but do not represent all of the technical spirit of the present disclosure. Thus, the present disclosure should be construed as including all the changes, equivalents, and substitutions included in the spirit and scope of the present disclosure at the time of filing this application. Further, the detailed description of related well-known configurations and functions is not provided when it is determined as unnecessarily making the scope of the present disclosure unclear. An exemplary embodiment of the present inventive concept will hereinafter be described in detail with reference to the accompanying drawings.

Figure 1:
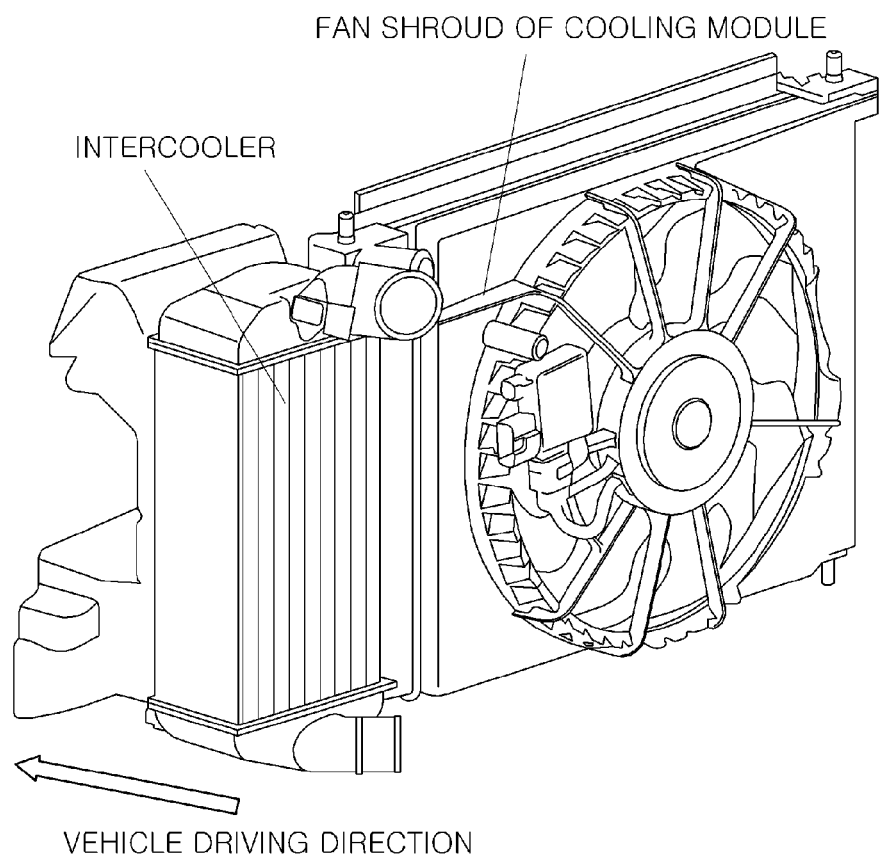
FIGS. 1-3 are drawings to illustrate a structure of an intercooler according to a prior art.
Figure 2:
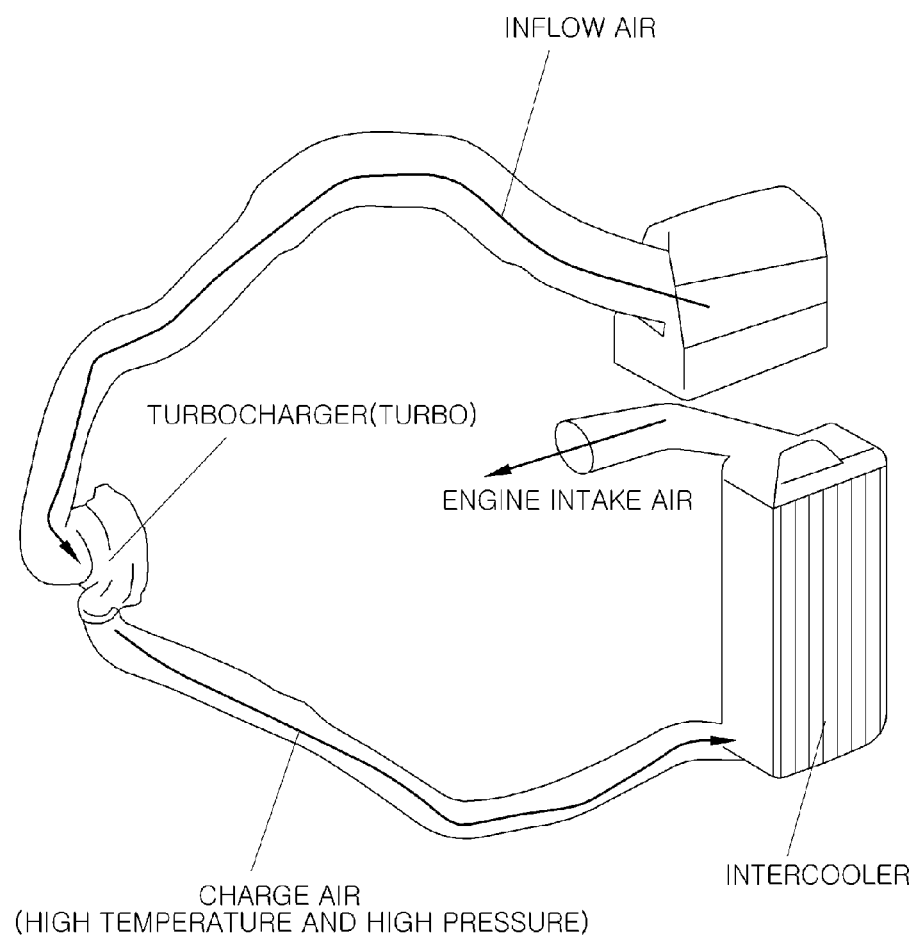
Figure 3:
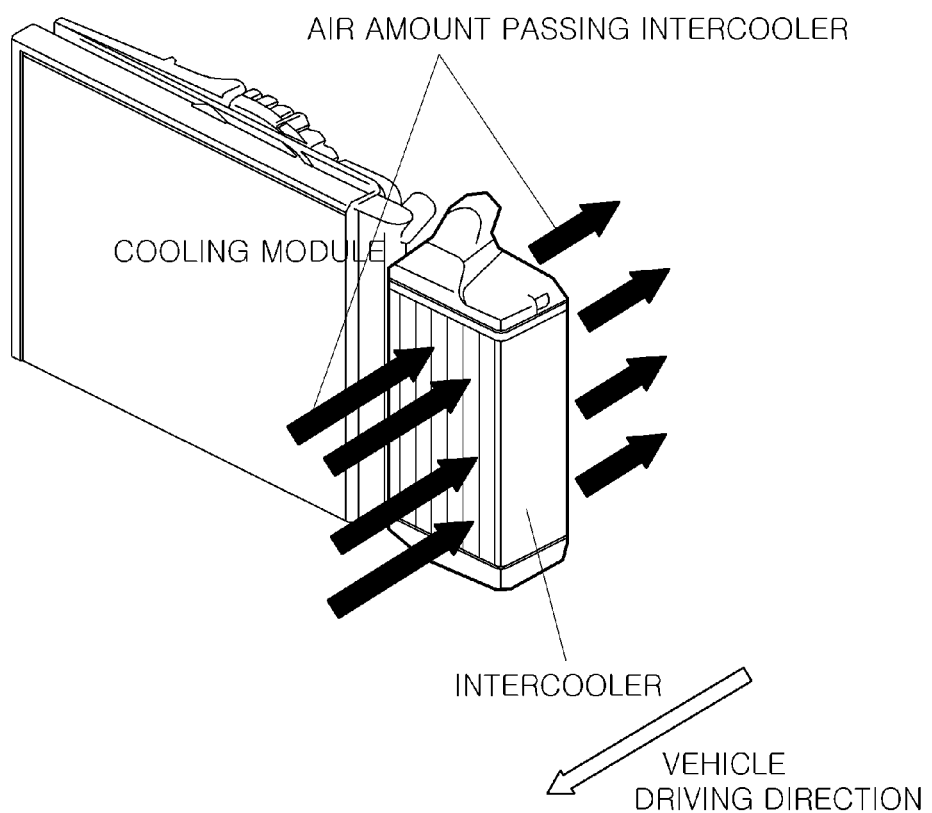
Figure 4:
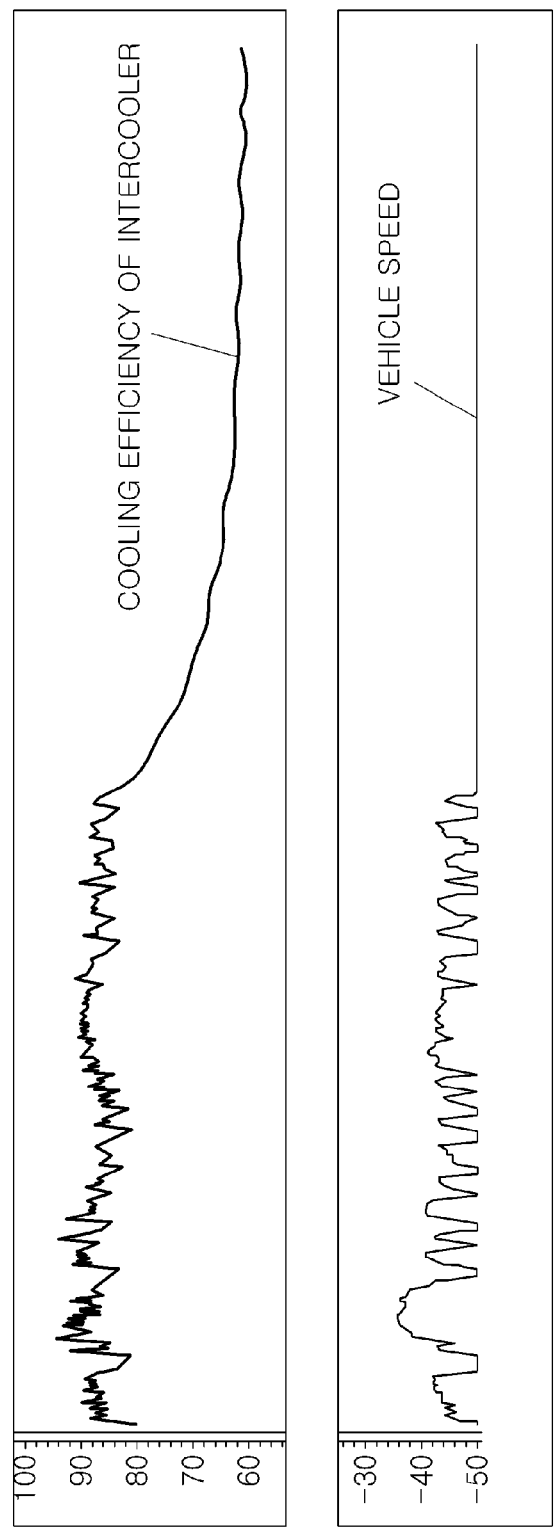
FIG. 4 is a relation graph between vehicle speed and intercooler cooling efficiency according to a prior art.
Figure 5:
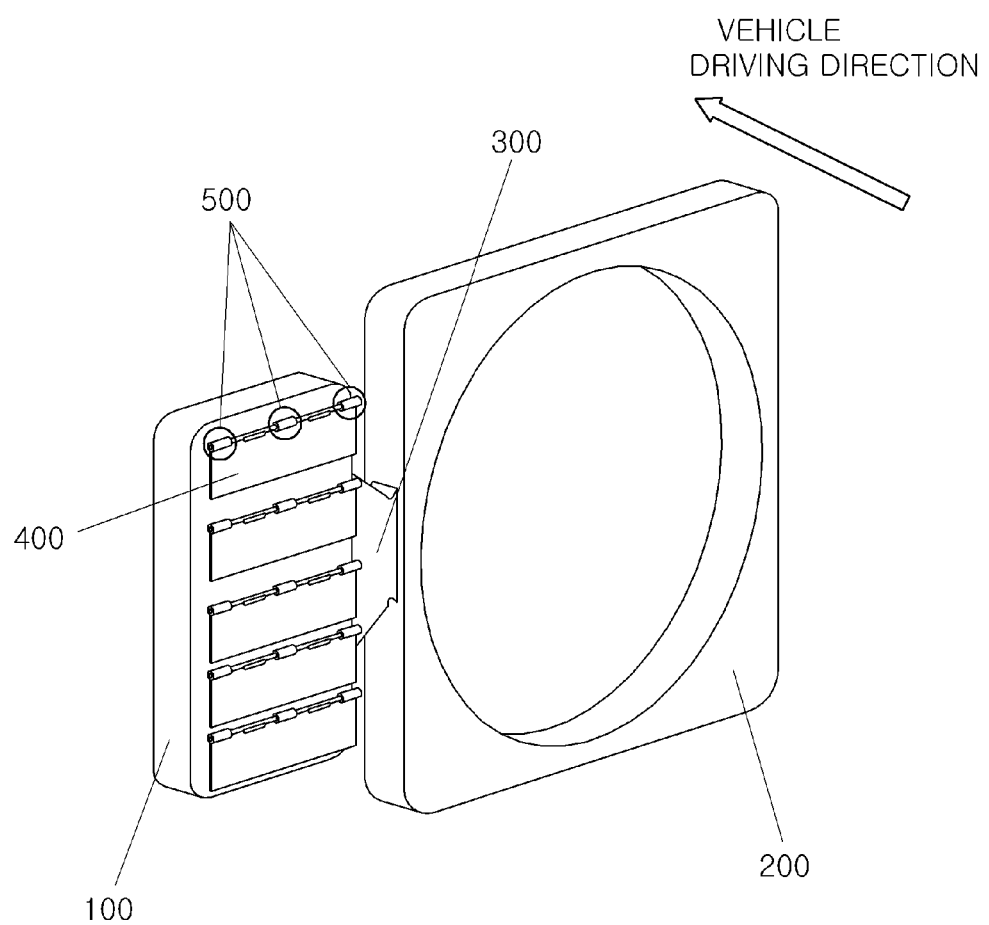
FIG. 5 is a rear perspective view of a structure of an intercooler cover integrated into a fan shroud according to an exemplary embodiment of the present inventive concept.
Figure 6:
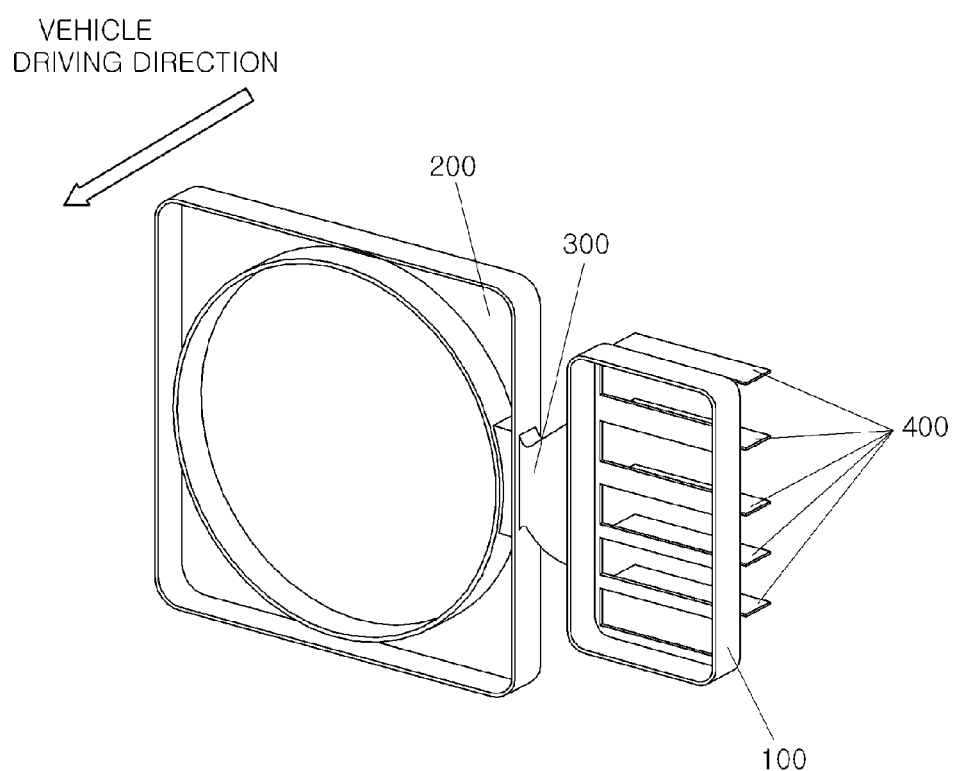
FIG. 6 is a front perspective view of a structure of an intercooler cover integrated into a fan shroud according to an exemplary embodiment of the present inventive concept.

FIG. 5 is a rear perspective view of a structure of an intercooler cover integrated into a fan shroud according to an exemplary embodiment of the present inventive concept, and FIG. 6 is a front perspective view of a structure of an intercooler cover integrated into a fan shroud according to an exemplary embodiment of the present inventive concept. Referring to FIGS. 5 and 6, a structure of an intercooler cover integrated into a fan shroud according to an exemplary embodiment of the present inventive concept may include an intercooler rear-side portion 100 which is mounted to a rear side of the intercooler; a cooling module rear-side portion 200 which is mounted to a rear side of a cooling module; and a ventilator 300 which communicates one side of the intercooler rear-side portion 100 with one side of the cooling module rear-side portion 200.

The structure of the intercooler cover integrated into the fan shroud according to the present disclosure includes at least one flap door 400 disposed at a surface which is vertical with respect to a vehicle driving direction in the intercooler rear-side portion 100 so as to block heat to be transferred from an engine compartment to the intercooler when a vehicle idles.

The flap door 400 may be opened when the vehicle travels, and closed when the vehicle idles. That is, the flap door 400 may be opened by headwind during vehicle driving, and closed by its own weight during vehicle idling. The flap door 400 may be not limited thereto but may be controlled by an actuator and so on in order to be opened when the vehicle travels and to be closed when the vehicle idles.

A material of the flap door 400 may be an insulator in order to prevent the heat in the engine compartment from being transferred to the intercooler when the vehicle stops so as to improve cooling efficiency of the intercooler. For this reason, the flap door 400 may be formed by a material having low heat conductivity.

The structure of the intercooler cover integrated into the fan shroud according to the present disclosure may further include a hinge 500, which is an elastic member, rotatably coupling the flap door 400 with the intercooler rear-side portion 100. That is, the flap door 400 may be closed by not only the gravity according to the mass of the flap door 400 or the control of the additional actuator as described above but also the elastic restoring force of the hinge 500 when the vehicle stops. Here, opening or closing the flap door 400 can be controlled by differently setting the mass of the flap door 400 or the elastic coefficient of the hinge 500.

The ventilator 300 may include a partition wall 310 which prevents air from flowing backward from the cooling module rear-side portion 200 to the intercooler rear-side portion 100. The structure of the intercooler cover integrated into the fan shroud according to the present disclosure generates an air flow from the intercooler rear-side portion 100 to the cooling module rear-side portion 200 so as to increase the amount of air passing through the intercooler, thereby improving the cooling efficiency of the intercooler.

The partition wall 310 may be formed at a side of the cooling module rear-side portion 200. The partition wall 310 may include a first partition wall 311 which is formed from a front end toward a rear end of the ventilator 300 with respect to the vehicle driving direction and a second partition wall 312 which is slantingly formed from the rear end of the ventilator 300 into the ventilator 300. In other words, the first partition wall 311 blocks the air flow guided by fan wind flowing into the ventilator 300, and the second partition wall 312 guides the air flow guided by fan wind to be easily discharged from the ventilator 300 to the cooling module rear-side portion 200.

The ventilator 300 has a central cross-sectional area that is wider than cross-sectional areas of both ends. That is, the ventilator 300 may have a diffuser shape having an increasing cross-sectional area, a pipe shape having a constant cross-sectional area, and a nozzle shape having a decreasing cross-section area, in which above listed cross-section areas are sequentially coupled along a direction from the intercooler rear-side portion 100 toward the cooling module rear-side portion 200. The air flow guided by the fan wind (or a part of headwind passing through the intercooler) may generate noise by impacting on the partition wall 310. Therefore, in order to reduce the above-mentioned noise, the central cross-sectional area of the ventilator 300 is enlarged so that air flow speed can be decreased temporarily.

Figure 7:
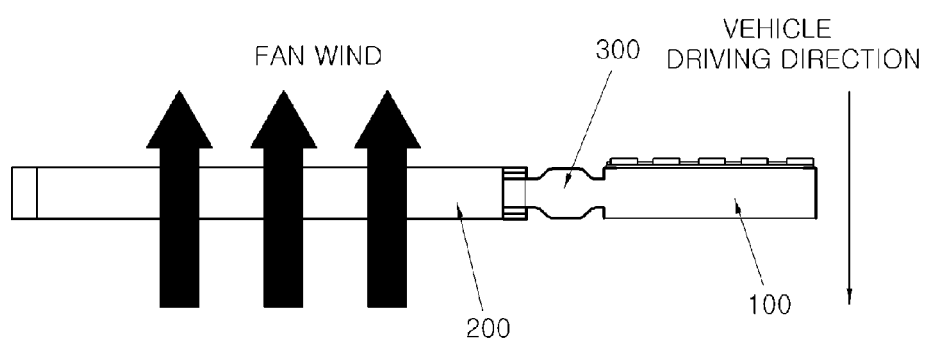
FIG. 7 is a plan view of a structure of an intercooler cover integrated into a fan shroud according to an exemplary embodiment of the present inventive concept.
Figure 8:
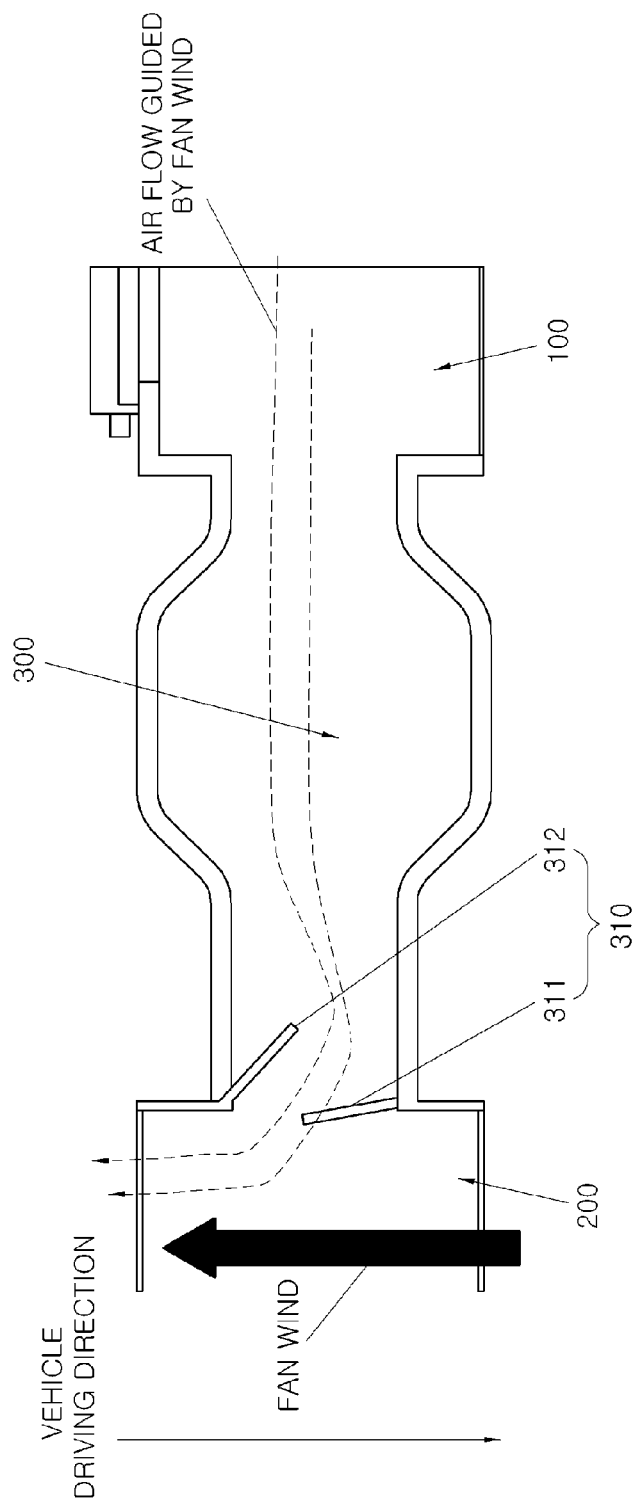
FIG. 8 is a cross-sectional plan view of a structure of an intercooler cover integrated into a fan shroud according to an exemplary embodiment of the present inventive concept.
Figure 9:
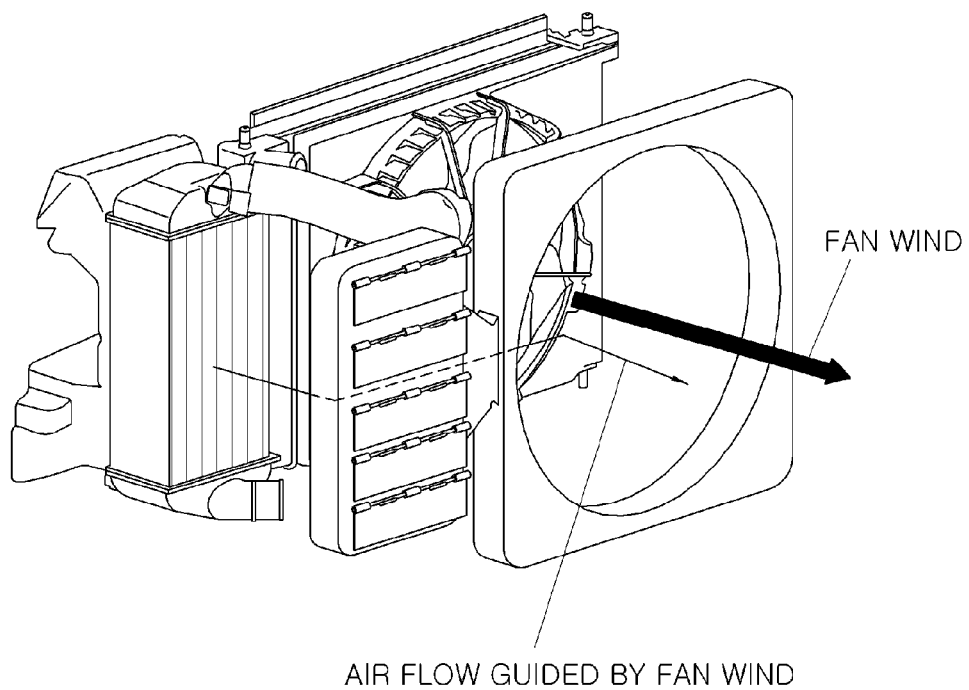
FIG. 9 illustrates a state of a structure of an intercooler cover integrated into a fan shroud according to an exemplary embodiment of the present inventive concept when a vehicle is stopped with idling.
Figure 10:
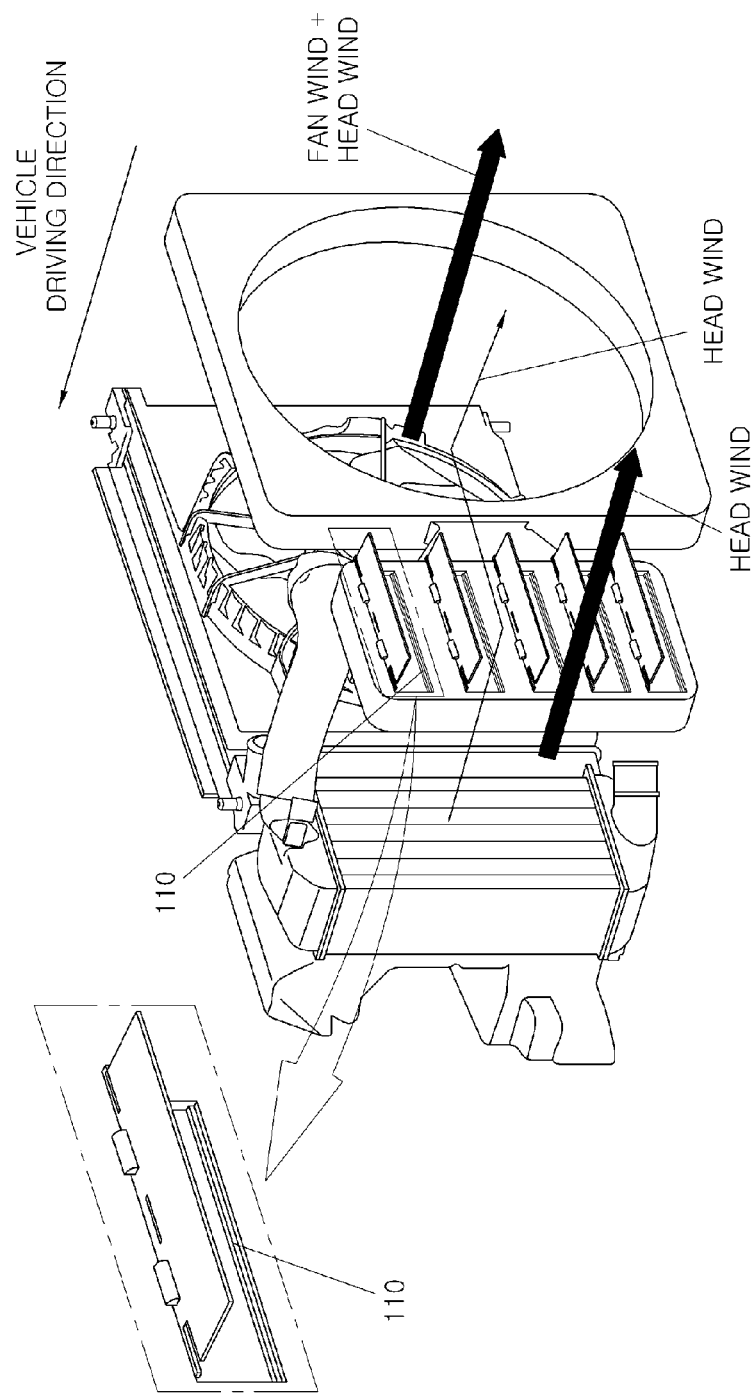
FIG. 10 illustrates a state of a structure of an intercooler cover integrated into a fan shroud according to an exemplary embodiment of the present inventive concept when a vehicle travels.

FIG. 7 is a plan view of a structure of an intercooler cover integrated into a fan shroud according to an exemplary embodiment of the present inventive concept, and FIG. 8 is a cross-sectional plan view of a structure of an intercooler cover integrated into a fan shroud according to an exemplary embodiment of the present inventive concept. FIG. 9 illustrates a state of a structure of an intercooler cover integrated into a fan shroud according to an exemplary embodiment of the present inventive concept when a vehicle stops, and FIG. 10 illustrates a state of a structure of an intercooler cover integrated into a fan shroud according to an exemplary embodiment of the present inventive concept when a vehicle travels.

Referring to FIGS. 7-10, according to the structure of an intercooler cover integrated into a fan shroud according to an exemplary embodiment of the present inventive concept, the flap door 400 is closed as there is no headwind when a vehicle stops.

On the other hand, fan wind is generated toward an opposite direction with respect to a vehicle driving direction as the fan of the cooling module is operated.

In the cooling module rear-side portion 200, an air flow speed increases but a pressure thereof decreases by the fan wind. Depending on the pressure difference, the air of the intercooler rear-side portion 100 flows to the cooling module rear-side portion 200 through the ventilator 300. As a result, the cooling efficiency of the air-cooled intercooler increases when the vehicle stops with idling by generating an air flow passing through the intercooler even when the vehicle stops. Simultaneously, the flap door 400, which is formed with an insulator, is closed so as to block heat of an engine compartment to be transferred to the intercooler, thereby increasing the cooling efficiency of the air-cooled intercooler when the vehicle stops traveling.

The headwind is generated during vehicle driving such that the flap door 400 is opened. Simultaneously, the fan of the cooling module is operated so as to generate the fan wind such that the headwind and the fan wind passing through the cooling module rear-side portion 200 are generated. Therefore, the air flow speed of the cooling module rear-side portion 200 generated by the headwind and the fan wind has a fast flow speed in comparison with the air flow of the intercooler rear-side portion 100 generated by only the headwind. Thus, the cooling module rear-side portion 200 becomes a state of low pressure in comparison with the intercooler rear-side portion 100, and a part of air flow passing through the intercooler by the headwind forms an air flow guided from the intercooler rear-side portion 100 to the cooling module rear-side portion 200. Thus, the amount of air flow passing through the intercooler is increased such that the high cooling efficiency is ensured even during vehicle driving in comparison with an air-cooled intercooler according to the prior art.

The intercooler rear-side portion 110 may include a stopper 110 disposed at a part where the flap door 400 is mounted in order for the flap door 400 to be opened only toward a direction opposite to a vehicle driving direction.

Figure 11:
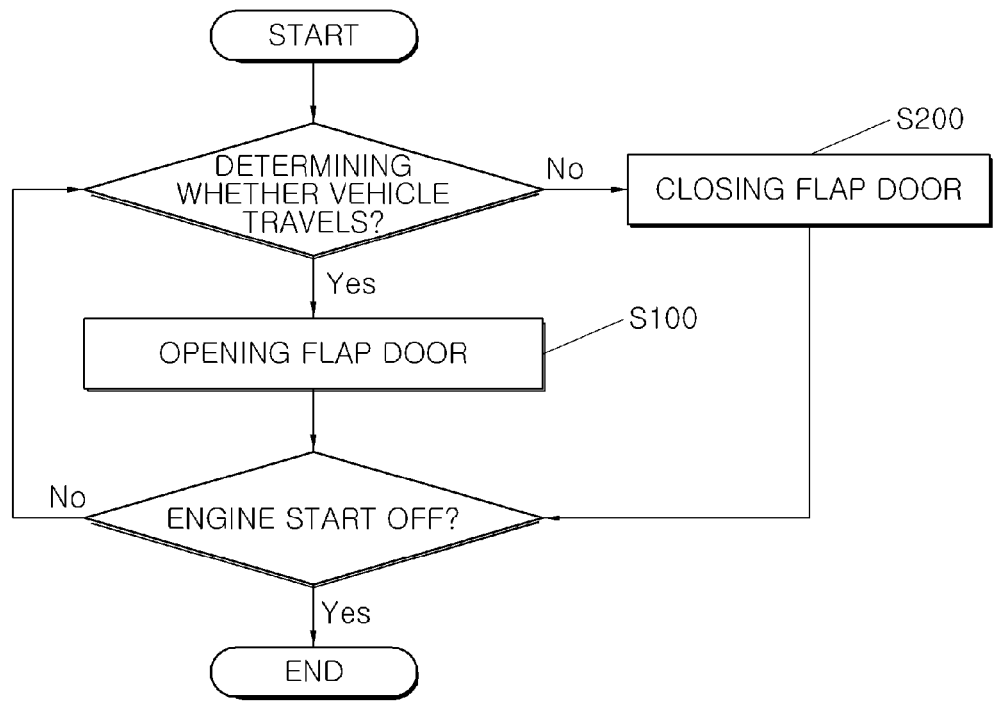
FIG. 11 is a flowchart of an operation method for a structure of an intercooler cover integrated into a fan shroud according to another exemplary embodiment of the present inventive concept.

FIG. 11 is a flowchart of an operation method for a structure of an intercooler cover integrated into a fan shroud according to another exemplary embodiment of the present inventive concept. Referring to FIG. 11, an operation method for a structure of an intercooler cover integrated into a fan shroud includes opening a flap door 400 by headwind when a vehicle travels (S100); and closing the flap door 400 when a vehicle stops and idles (S200).

The exemplary embodiments as discussed previously are merely examples which may enable a person (hereinafter referred to as 'a skilled person in the relevant technology'), who has a typical knowledge in a technology field that the present disclosure belongs to, to execute the present disclosure easily but is not limited to the aforesaid exemplary embodiment and the attached drawings and hence this does not result in limiting the scope of right in this invention. Therefore, it will be apparent to a skilled person in the relevant technology that several transposition, transformation, and change is possible within a scope of not deviating from the technological thought in the present disclosure and it is obvious that a easily changeable part by a skilled person in the relevant technology is included within the scope of right in the present disclosure as well.

What is claimed is:

1. A structure of a vehicle intercooler cover integrated into a fan shroud, the structure comprising:
   an intercooler rear-side portion which covers a rear side of an intercooler;
   a cooling module rear-side portion which covers a rear side of a cooling module; and
   a ventilator which allows communication between one side of the intercooler rear-side portion and one side of the cooling module rear-side portion,
   wherein the ventilator comprises a partition wall which prevents air from flowing backward from the cooling module rear-side portion to the intercooler rear-side portion.

2. The structure of claim 1, further comprising:
   at least one flap door which is installed at another side of the intercooler rear-side portion, the other side being vertical to a vehicle driving direction to block heat to be transferred from an engine compartment to the intercooler when a vehicle stops and idles.

3. The structure of claim 2, further comprising:
   a hinge rotatably coupling the flap door with the intercooler rear-side portion.

4. The structure of claim 3, wherein the hinge is a spring.

5. The structure of claim 2, wherein the flap door is opened when the vehicle travels.

6. The structure of claim 2, wherein the flap door is closed when the vehicle stops with idling.

7. The structure of claim 2, wherein the flap door is formed of an insulator.

8. The structure of claim 2, wherein the intercooler rear-side portion comprises a stopper formed at an opening of the flap door to open the flap door in one direction opposite to the vehicle driving direction.

9. The structure of claim 1, wherein the partition wall is installed at the one side of the cooling module rear-side portion.

10. The structure of claim 1, wherein the partition wall comprises a first partition wall which is connected to a front end toward a rear end of the ventilator with respect to a vehicle driving direction.

11. The structure of claim 1, wherein the partition wall comprises a second partition wall which is slantingly connected to a rear end of the ventilator with respect to a vehicle driving direction into the ventilator.

12. The structure of claim 1, wherein a central cross-sectional area of the ventilator is wider than cross-sectional areas of both ends of the ventilator.

13. The structure of claim 12, wherein the ventilator has a diffuser shape having an increasing cross-sectional area, a pipe shape having a uniform cross-sectional area, and a nozzle shape having a decreasing cross-sectional area,
   wherein the cross-sectional areas of the ventilator are sequentially coupled from the intercooler rear-side portion toward the cooling module rear-side portion.

14. A method for operating a structure of a vehicle intercooler cover integrated into a fan shroud, the method comprising:

opening a flap door by headwind when a vehicle travels; and closing the flap door when the vehicle stops and idles wherein the structure includes an intercooler rear-side portion, a cooling module rear-side portion, and a ventilator, and wherein the ventilator allows communication between the intercooler rear-side portion and the cooling module rear-side portion and has a partition wall which prevents air from flowing backward from the cooling module rear-side portion to the intercooler rear-side portion.

15. The method of claim 14, further comprising prior to the step of opening:

determining whether the vehicle travels.

16. The method of claim 15, comprising:

closing the flap door when the vehicle does not travel.

17. The method of claim 14, further comprising:

determining whether a vehicle engine is off.

* * * * *